United States Patent Office 3,524,542
Patented Aug. 18, 1970

3,524,542
HEAT SEALABLE BONDING CORD
Walter K. Chlystun, Spartanburg, S.C., assignor to Deering Milliken Research Corporation, Spartanburg, S.C., a corporation of Delaware
No Drawing. Continuation of application Ser. No. 374,154, June 10, 1964. This application Mar. 11, 1969, Ser. No. 806,326
Int. Cl. B65d 71/00; B65b 13/00; B65h 69/08
U.S. Cl. 206—65       11 Claims

ABSTRACT OF THE DISCLOSURE

This invention relates to a bonding cord composed of blends of thermoplastic and non-thermoplastic materials and more particularly to a heat sealable bonding cord which seals without loss of elongation resistance.

---

This is a continuation of application Ser. No. 374,154, filed June 10, 1964, now abandoned.

A wide variety of packaging materials have been employed to secure a multicomponent group into a unitary package. The most common of these packaging materials are materials such as for instance pressure-sensitive tapes and common wrapping cord, however, do not lend themselves to automated operations, that is to say the pressure-sensitive tapes and common wrapping cords are primarily suited for hand operations. It is known that multicomponent packages may be secured by means of wrapping with a thermoplastic material and effecting a heat seal. The thermoplastic material will, however, generally lose its elongation resistance when sufficient temperature is applied to the material to effect a heat seal. The loss of elongation resistance in the thermoplastic wrapping material results in a loose and often unacceptable package. Efforts have been made to overcome the loss of elongation resistance in an all thermoplastic packaging material by placing a thermoplastic coating on a non-thermoplastic substrate and employing the coated wrapping material as a heat sealable bonding cord. Thermoplastic coated bonding cords, however, are generally lacking in that degree of adhesion which is necessary between the coating and the substrate to prevent flaking and chipping of the coating when the cord passes through those tortuous configurations to which a bonding cord is often subjected in wrapping operations. Flaking and chipping of a coating not only result in the coated bonding cord itself being unsuitable for wrapping operations, but the flaked and chipped coating residue will often render the machinery with which the bonding cord is being applied nonfunctional.

It is therefore an object of this invention to provide a heat sealable bonding cord comprising a homogeneous blend of thermoplastic and non-thermoplastic materials.

It is another object of this invention to provide a heat sealable bonding cord comprising a homogeneous blend of thermoplastic and non-thermoplastic fibrous materials.

It is still another object of this invention to provide a heat sealable bonding cord which will retain substantial amounts of elongation resistance during heat sealing operations.

In accordance with this invention, it has now been discovered that a heat sealable bonding cord which will undergo heat sealing operations while retaining substantial amounts of elongation resistance may be prepared by spinning a cord from a homogeneous blend of thermoplastic and non-thermoplastic materials. The term "homogeneous" as employed herein is meant to include homogeneous blends of thermoplastic and non-thermoplastic fibers as well as homogeneous blends of substantially identical fibers which are non-thermoplastic fibers which are surface polymer grafted with thermoplastic materials. The bonding cord should contain from 20% to 70% of a thermoplastic component which flows when heated and from 30% to 80% of a second component which neither flows nor substantially degrades when heated to the flow temperature of the thermoplastic component. Preferably, the bonding cord contains between about 40% and about 60% of each of the thermoplastic and non-thermoplastic components. A 50:50 by weight mixture has been found to be very satisfactory. While the bonding cord will usually consist entirely of these two essential components, it can also include other materials, e.g., lubricants, waxes, softeners, sizing materials, etc. As with all bonding cords, the cord should be formed of such materials and so constructed as to have sufficient strength to withstand the wrapping tensions and also so as to have substantial residual strength after the thermoplastic component has flowed in the heating operation so that there will be no substantial loss in elongation resistance. The thermoplastic component and the non-thermoplastic component can be in the from of separate ends of a plied cord or blended together in the same end or ends or the thermoplastic component may be core spun about a non-thermoplastic continuous filament. Either essential component, however, can be in continuous filament or multifilament form and the other component in spun staple form or they both can be in filament, multifilament or in staple form. The blended continuous filament form is preferred because of maximum homogeneity and strength.

The term "fibrous" means material in the form of continuous filament or staple and films which have been slit and twisted or folded so as to resemble continuous filament.

The thermoplastic first component of the above-described bonding cord is one having a Vicat flow temperature, (A.S.T.M. D569–59, Procedure A) between about 100° and 225° C. Such materials include polypropylene, polyethylene, preferably high density polyethylene, polyvinyl alcohol, polyvinyl acetate, cellulose acetate and other thermoplastic derivatives of cellulose, polyvinyl butyrates, the lower melting nylons, and other fiber-forming polymers and polymeric materials, i.e., those polymers which can be spun and oriented into a fibrous form which can be formed into yarn. To improve flexibility, the conventional softeners and plasticizers can be incorporated in such thermoplastic materials. Thermoplastic materials which become thermosetting upon heating can also be used, e.g., the aminoplasts and the phenoplasts. Of the thermoplastic first component employed, polypropylene gives outstanding results and is thus preferred.

The second component can be any fibrous material in the staple, filament or multifilament form which is conventionally employed in the textile industry to form yarns or threads and which neither flows nor is substantially degraded when heated at a temperature and for a time sufficient to cause the thermoplastic component to flow. Preferably, the second fibrous component is non-thermoplastic, e.g., cotton, rayon, siliceous fibers or wool. The second fibrous component should be a high strength material, i.e., one of sufficient strength to form a useful bonding cord by itself. For various reasons, and principally low elongation, siliceous fibers are preferred as the second fibrous component.

As stated above, the two essential ingredients of the cord can be intimately blended into one or more ends or they can be separate ends plied together. It has been found, however, that better adhesion is often obtained using the same materials if the two components are intimately blended together.

The thermoplastic component and the non-thermoplastic component may be present in the same fiber where a surface polymer grafted material is employed in the manufacture of the cord. Polymer grafted materials which have been found suitable for purposes of this invention are thermoplastic materials which have been grafted to a fiber selected from the group consisting of cotton, hemp, linen and rayon fibers. Thermoplastic materials which are suitable for use as the thermoplastic component of the polymer grafted fibers are thermoplastic materials such as for instance polyethylene, polypropylene, polystyrene, and polyacrylates. Grafting of the thermoplastic material on the surface of the cellulosic fiber may be carried out by titanation or zirconation of the cellulose fiber followed by treatment with an organo metallic alkylation or arylation agent. The cellulose fiber then contains centers of catalytic activity through which olefinically unsaturated hydrocarbon monomers may be grafted to the surface of the fiber. It should be understood, of course, that other grafting processes which will place sufficient quantities of thermoplastic materials on the surface of a non-thermoplastic fiber to render the fiber heat sealable are also suitable for purposes of this invention.

The following specific examples of the heat sealable bonding cord are given for purposes of illustration and should not be considered as limiting the spirit or scope of this invention.

EXAMPLE I

Eleven ends of 200 denier single monofilament rayon and five ends of 420 denier single filament polypropylene each having manufacturer's twist are plied with 2.5 turns of S twist. The resultant yarn is found to have a minimum break strength of 36 lbs. and to have an elongation of 2.22% when subjected to a 10 lb. load. The yarn gauge is .024 and has a weight of 1118 yards per lb.

EXAMPLE II

Eight ends of two ply 20s yarn composed of 50% spun Avril (regenerated cellulose manufactured by American Viscose Corporation) and 50% polypropylene are given a first twist of 13.15 turns of S twist and a final twist of 2.5 turns of S twist. The resulting bonding cord has a minimum break strength of 22 lbs., a gauge of .034 and a weight of 1021 yards per lb.

EXAMPLE III

Eight ends of two ply 20s yarn composed of 50% spun siliceous fibers and 50% spun polypropylene are given a first twist of 10 turns S twist and a final twist of three turns S twist. The resultant yarn is found to have a minimum breaking strength of 25 lbs., a gauge of about 0.26 and a weight of 1000 yards per lb.

EXAMPLE IV

Seven ends of 150/1 siliceous fibers having manufacturer's twist and five ends of 420/1 polypropylene having manufacturer's twist are plied together so as to have 2.5 turns of S twist. The resultant bonding cord is found to have a gauge of .0219, a weight of 1012 yards per lb., a minimum break strength of 29 lbs. and an elongation under a 10 lb. load of 0.68%.

Elongation resistance is found to be a critical feature in the preparation of a tightly wrapped package, this characteristic being a paramount feature where a certain pressure is required between individual components of a multicomponent package. Packages such as for instance stacked battery packages of the graphite cake type which are made up of individual 1.5 volt wafers rely upon a pressure contact to transmit electrical current from wafer cell to wafer cell and thereby provide the appopiate cumulative current for the battery package. The stacked battery package must, of necessity, be secured by an appropriate tension which is produced by the bonding cord. It may be noted from the specific examples given of the bonding cords of this invention that all of the cords have minimum elongation. The minimum elongation is retained even when the cord is subjected to heat sealing operations. The retention of elongation resistance is due to the presence of the non-thermoplastic fibrous component.

When the package being wrapped contains ingredients which are chemically destructive such as for instance battery acid, it is preferred that the non-thermoplastic component of the yarn be siliceous fibers.

The bonding cord of this invention lends itself to continuous packaging operations. The continuous operation may be conveniently carried out by securing a multi-component assembly on a moving conveyor, compressing the assembly by exerting a downward pressure such as for instance pressure from a hydraulic or pneumatic piston continuously wrapping exposed edges of each of the multicomponent assemblies with at least one 360° turn of heat sealable bonding cord, releasing the piston pressure, contacting a portion of the bonding cord wrap with a heated platen such as for instance the cartridge type platen model CDE marketed by Edwin L. Wiegand Company of Pittsburgh, Pa. and then cutting the free portion of cord existing between each of the wrapped assemblies.

That which is claimed is:

1. A package including at least one wrap of an encompassing bonding cord with overlapping end portions of the cord wrap being heat sealed together, said cord comprising a substantially homogeneously distributed blend of thermoplastic and non-thermoplastic textile fibers or filaments and said cord providing elongation resistance at elevated temperatures.

2. The package of claim 1 wherein said bonding cord is a bonding cord comprising a homogeneously distributed blend of 20% to 70% by weight of said thermoplastic fibers or filaments and 30% to 80% by weight of said non-thermoplastic fibers or filaments.

3. The package of claim 1 wherein said thermoplastic fibers or filaments are selected from the class consisting of polypropylene, polyethylene, polyvinyl alcohol, polyvinyl acetate, polyvinyl butyrates, thermoplastic derivatives of cellulose, low melting nylons, aminoplast materials and phenoplast materials and said non-thermoplastic fibers or filaments are selected from the class consisting of cotton, rayon, siliceous fibers and wool.

4. The package of claim 1 wherein said bonding cord is a twisted bonding cord comprising a homogeneously distributed blend of thermoplastic polymer fibers and non-thermoplastic cellulosic fibers.

5. The package of claim 1 wherein said non-thermoplastic filaments are continuous siliceous filaments.

6. The package of claim 1 wherein said thermoplastic fibers or filaments are polypropylene.

7. A package of claim 1 wherein said bonding cord is a twisted cord.

8. A stacked battery package comprising a plurality of elements bound together with at least one wrap of a bonding cord comprising a substantially homogeneously distributed blend of thermoplastic and non-thermoplastic textile fibers or filaments with overlapping end portions of the cord being heat sealed together.

9. The stacked battery package of claim 8 wherein said bonding cord is a bonding cord comprising a homogeneously distributed blend of 20% to 70% by weight of a thermoplastic fiber and 30% to 80% by weight of a non-thermoplastic fiber.

10. The stacked battery package of claim 8 wherein said bonding cord is a bonding cord comprising a homogeneously distributed blend of 20% to 70% by weight of a thermoplastic fiber and 30% to 80% by weight of a non-thermoplastic fiber.

11. The stacked battery package of claim 8 wherein said bonding cord is a bonding cord comprising a homogeneously distributed blend of thermoplastic polymer grafted non-thermoplastic cellulosic fibers.

References Cited

UNITED STATES PATENTS

| | | | |
|---|---|---|---|
| 2,817,937 | 12/1957 | McNamara et al. | 53—198 |
| 3,200,028 | 8/1965 | Chisholm. | |
| 3,337,381 | 8/1967 | Kuhn | 156—93 |
| 3,184,354 | 5/1965 | Strother | 156—73 |

OTHER REFERENCES

Eustis, Abstract of Application, Ser. No. 81,586, published Aug. 15, 1950.

THERON E. CONDON, Primary Examiner

N. ABRAMS, Assistant Examiner

U.S. Cl. X.R.

24—16; 53—3; 57—140; 100—2; 156—158